(12) United States Patent
Champagnac et al.

(10) Patent No.: US 12,117,129 B2
(45) Date of Patent: Oct. 15, 2024

(54) METHOD FOR CHECKING THE LEAKPROOFNESS OF A LEAKPROOF AND THERMALLY INSULATING TANK FOR STORING A FLUID

(71) Applicant: GAZTRANSPORT ET TECHNIGAZ, Saint Remy les Chevreuse (FR)

(72) Inventors: Maxime Champagnac, Saint Remy les Chevreuse (FR); Pierre Jolivet, Saint Remy les Chevreuse (FR); Mathieu Petitpas, Saint Remy les Chevreuse (FR); Mael Bleomelen, Saint Remy les Chevreuse (FR); Damien Brenac, Saint Remy les Chevreuse (FR); Laurent Spittael, Saint Remy les Chevreuse (FR); Vincent Briatte, Saint Remy les Chevreuse (FR); Julien Glory, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 693 days.

(21) Appl. No.: 17/311,828

(22) PCT Filed: Dec. 19, 2019

(86) PCT No.: PCT/FR2019/053212
§ 371 (c)(1),
(2) Date: Jun. 8, 2021

(87) PCT Pub. No.: WO2020/128370
PCT Pub. Date: Jun. 25, 2020

(65) Prior Publication Data
US 2022/0034453 A1    Feb. 3, 2022

(30) Foreign Application Priority Data

Dec. 21, 2018    (FR) ...................... 1873900

(51) Int. Cl.
*G01M 3/00*    (2006.01)
*F17C 3/02*    (2006.01)
(Continued)

(52) U.S. Cl.
CPC ............ *F17C 3/027* (2013.01); *F17C 13/026* (2013.01); *G01M 3/002* (2013.01); *G01M 3/226* (2013.01);
(Continued)

(58) Field of Classification Search
None
See application file for complete search history.

(56) References Cited

U.S. PATENT DOCUMENTS

| 3,911,727 A | 10/1975 | Katsuta et al. |
| 4,404,843 A | 9/1983 | Johnson et al. |

(Continued)

FOREIGN PATENT DOCUMENTS

| EP | 0102865 A1 | 3/1984 |
| FR | 2202595 A5 | 5/1974 |

(Continued)

OTHER PUBLICATIONS

First Chinese Office Action with English translation for Application Serial No. 201980083822.1 dated Mar. 28, 2023.
(Continued)

*Primary Examiner* — Erica S Lin
(74) *Attorney, Agent, or Firm* — Notaro, Michalos & Zaccaria P.C.

(57) ABSTRACT

A method for checking the sealing of a sealed tank for storing a liquefied gas at low temperature, the tank having an inner hull and a secondary sealing membrane, a secondary space that is arranged between the inner hull and the secondary sealing membrane, a primary sealing membrane and a primary space that is arranged between the primary sealing membrane and the secondary sealing membrane is disclosed. The method has the following main steps: generating a pressure lower than the pressure of the primary space in the secondary space using a suction device, measuring the temperature of an outer surface of the inner hull, and detecting the location of a sealing defect of the secondary sealing membrane in the form of a cold spot on the outer surface of the inner hull.

15 Claims, 5 Drawing Sheets

(51) Int. Cl.
F17C 13/02 (2006.01)
G01M 3/22 (2006.01)

(52) U.S. Cl.
CPC .............. F17C 2201/0157 (2013.01); F17C 2203/0379 (2013.01); F17C 2203/0631 (2013.01); F17C 2205/0352 (2013.01); F17C 2221/033 (2013.01); F17C 2227/0114 (2013.01); F17C 2250/038 (2013.01); F17C 2250/0439 (2013.01); F17C 2250/0443 (2013.01); F17C 2250/0491 (2013.01); F17C 2260/038 (2013.01); F17C 2270/0107 (2013.01)

(56) References Cited

U.S. PATENT DOCUMENTS

| | | | |
|---|---|---|---|
| 4,498,304 A | 2/1985 | Guilhem | |
| 2009/0211263 A1* | 8/2009 | Coyle | F25J 3/0233 62/50.2 |
| 2016/0159438 A1* | 6/2016 | Yoo | B63B 25/16 220/560 |
| 2017/0138536 A1* | 5/2017 | Bleomelen | F17C 3/025 |

FOREIGN PATENT DOCUMENTS

| | | |
|---|---|---|
| FR | 2294439 A1 | 7/1976 |
| FR | 2509839 A1 | 6/1982 |
| FR | 2515347 A1 | 4/1983 |
| FR | 2946428 A1 | 12/2010 |
| FR | 2952715 A1 | 5/2011 |
| GB | 888247 A | 1/1962 |
| GB | 1450047 A | 9/1976 |
| JP | S56-161544 U | 5/1955 |
| JP | S58-017299 A | 2/1983 |
| JP | S59-62800 A | 4/1984 |
| KR | 1020080093541 A | 10/2008 |
| KR | 1020120134193 A | 12/2012 |
| WO | 2018129571 A1 | 7/2018 |
| WO | 2018148305 A1 | 8/2018 |

OTHER PUBLICATIONS

Korean Third Party Summary of Observations with English translation.
Japanese Office Action with English translation for Application Serial No. 2021535595 dated Aug. 23, 2023.
Chinese Grant Notice with English translation for Application Serial No. 201980083822.1 dated Sep. 18, 2023.
International Search Report for corresponding PCT application No. PCT/FR2019/053212, mailed May 8, 2020.

* cited by examiner

METHOD FOR CHECKING THE LEAKPROOFNESS OF A LEAKPROOF AND THERMALLY INSULATING TANK FOR STORING A FLUID

TECHNICAL FIELD

The invention relates to the field of sealed and thermally insulating tanks with membranes. In particular, the invention relates to the field of sealed and thermally insulating tanks for the storage and/or the transport of liquid at low temperature, such as tanks for transporting liquefied petroleum gas (also referred to as LPG) having, for example, a temperature between −50° C. and 0° C., or for transporting liquefied natural gas (LNG) at approximately −162° C. at atmospheric pressure. These tanks may be installed onshore or on a floating structure. In the case of a floating structure, the tank may be intended for the transport of liquefied gas at low temperature or to receive liquefied gas at low temperature which is used as fuel for propelling the floating structure. More specifically, the invention relates to devices and methods for detecting leakages in a secondary membrane of such a tank.

Technical Background

Tanks of vessels for transporting liquefied natural gas generally comprise a carrier structure which provides mechanical rigidity, a primary sealing membrane which is intended to be in contact with the product contained in the tank and a secondary sealing membrane which is arranged between the primary sealing membrane and the carrier structure. The secondary sealing membrane is intended to retain the product in the event of a leakage in the primary sealing membrane. The space between the primary sealing membrane and the secondary membrane is referred to as the primary space and the space between the secondary sealing membrane and the carrier structure is referred to as the secondary space.

The secondary sealing membrane is invisible and inaccessible after the tank has been produced. It is thus impossible to directly observe any faults of this membrane such as a scratch, a local dislocation of the membrane or an air channel between two components of which the membrane is composed.

Several methods have therefore been established in order to diagnose the sealing of the secondary membrane.

Document FR2946428 describes a method for testing the sealing of the tank, in particular for locating leakages of the secondary membrane, in which the primary space contains a first gas which cannot be condensed or which has a condensation temperature which is lower than the mean temperature of the primary membrane. This method comprises a step of injecting a second gas which has a condensation temperature greater than the mean temperature of the primary membrane in the secondary space, a step of placing the secondary space under excess pressure relative to the primary space, and a step of detecting one or more hot spots of the primary membrane which correspond to a deposit of the second gas which has condensed in contact with the primary membrane. As a result of these features, in the case of non-conformity of the secondary membrane, the second gas escapes into the primary space and comes into contact with the primary membrane, close to the leakage. Since it has a condensation temperature greater than the mean temperature of the primary membrane, the second gas condenses and in doing so transfers energy in the form of heat, corresponding to the state change latent heat thereof, to the primary membrane. A hot spot is thus generated on the primary membrane. The detection of this hot spot inside the tank enables the location of the non-conformity of the secondary membrane. However, this method applies only if the tank is empty. For questions of safety, it is important to also be able to detect a leakage which is generated when the tank is full.

Alternatively, document FR2294439 describes a method for testing the sealing of a secondary membrane of a tank which first involves generating between the secondary space and the primary space a temperature difference obtained using appropriate heating devices, and generating a pressure difference, obtained using any appropriate means, between these two spaces. In this manner, the leakage currents through the secondary sealing membrane are amplified and consequently so are the temperature gradients on the outer surface of the tank. The detection of the temperature gradient on the outer surface of the tank is carried out using a thermographic camera. This method is nonetheless energy intensive for generating and maintaining the temperature difference between the two spaces.

Document GB888247A describes a method for checking the sealing of a device for storing liquids at very low temperatures. The method involves monitoring the pressure within the primary space and the secondary space of the device using a gas pump, a flow rate counter and/or a pressure indicator in order to detect a variation of the pressure. This method is carried out on a device which comprises in particular a self-supporting metal reservoir.

SUMMARY

A notion on which the invention is based is to provide devices and methods for detecting leakages in a sealed and thermally insulating tank which is filled with liquid at low temperature which does not have these disadvantages. In this manner, an object of the invention is to be able to locate abnormal porosities of the secondary sealing membrane, even when the leakage rate is very high.

To this end, the present invention relates to a method for checking the sealing of a sealed and thermally insulating tank for storing a liquefied gas at low temperature, the tank being at a low temperature, the tank comprising a carrier structure which has an inner hull and an outer hull, a confined space between the inner hull and the outer hull, a primary sealing membrane which is intended to be in contact with the liquefied gas at low temperature contained in the tank, and a secondary sealing membrane which is arranged between the primary sealing membrane and the inner hull, a primary space between the primary sealing membrane and the secondary sealing membrane and a secondary space between the secondary sealing membrane and the inner hull, the primary space comprising a primary gas inlet and a primary gas outlet, the secondary space comprising a secondary gas inlet and a secondary gas outlet. The method comprises the main steps which involve generating a pressure lower than the pressure of the primary space in the secondary space using a suction device which is connected to a secondary gas outlet, measuring the temperature of an outer surface of the inner hull from the confined space located around the inner hull, detecting the location of a sealing defect of the secondary sealing membrane in the form of a cold spot on the outer surface of the inner hull.

The method for detecting leakage in a secondary membrane is implemented in a tank at low temperature. The primary space is pressurized in particular using an inert gas such as nitrogen, and the secondary space is held at a lower pressure compared with that of the primary space using the suction device. In the event of a local sealing defect in the secondary membrane, a flow of gas migrates locally from the primary space to the secondary space. Since the primary space is in contact with the primary sealing membrane and it is itself in contact with the liquefied gas at low temperature, the gas originating from the primary space is cold. The flow of gas arriving locally in the secondary space can be detected in the form of a cold spot on the inner hull of the vessel. Each cold spot is highlighted as a probable leakage zone of the membrane. This method enables leakages to be detected in the secondary membrane even when it is difficult to make the pressure rise in the primary space, for example, as a result of a very high leak rate.

The term "liquefied gas at low temperature" is intended to be understood to be any body which is in the vapor state under normal pressure and temperature conditions and which has been placed in the liquid state by lowering the temperature thereof.

The term "confined space" is intended to be understood to be the ballasts, the duct keels, the cofferdams, the passageways and the closure bridge of the tank, also referred to as the "trunk deck".

A tank at low temperature is intended to be understood to be a tank in which the liquefied gas at low temperature occupies at least 20% of the volume of the tank, preferably 70%, or a tank which does not contain a load of liquefied gas, or a volume less than 20% of the volume of the tank but then, in this instance, the tank is cooled by means of spraying, or projection, of a liquefied gas at low temperature, such as, for example, liquid nitrogen or LNG.

According to an embodiment, the primary sealing membrane rests directly on insulating materials contained in the primary space and the secondary sealing membrane rests directly on insulating materials contained in the secondary space.

According to an embodiment, the gas pressure above the liquid phase in the tank filled with liquefied gas at low temperature is greater by at least 5000 Pa than atmospheric pressure.

According to an embodiment, the method further comprises a step involving injecting an inert gas into the primary space from the primary gas inlet.

According to an embodiment, the injection of inert gas is carried out by a compressor.

According to an embodiment, the injection of inert gas is carried out at a pressure between 3 and 8 bar.

According to an embodiment, the primary gas outlet is in a closed position during the main steps.

According to an embodiment, the primary space has an additional gas inlet and the injection of inert gas is further carried out via the additional gas inlet.

According to an embodiment, the secondary gas inlet is in a closed position.

According to an embodiment, the secondary space has a second secondary gas outlet, the second secondary gas outlet being in an open position in addition to the secondary gas outlet.

According to an embodiment, the pressure difference between the primary space and the secondary space is between 2100 Pa and 2900 Pa, the primary space being under excess pressure by the pressure difference compared with the secondary space.

This range of pressure difference between the primary space and secondary space enables a flow of gas to be generated which is sufficient to be able to detect a leak without the risk of tearing away or damaging the primary membrane.

According to an embodiment, the method further comprises an intermediate step which involves measuring the temperature of the outer surface of the inner hull from the confined space when the pressure difference between the primary space and the secondary space is between 800 Pa and 1200 Pa, the primary space being under excess pressure by the pressure difference compared with the secondary space. This enables the integrity of the inner hull to be tested before the main steps.

According to an embodiment, the pressures of the primary space and the secondary space are kept stable during the step which involves measuring the temperature of the outer surface of the inner hull during the main temperature measurement step and the intermediate temperature measurement step.

According to an embodiment, the method further comprises a preliminary step involving measuring the temperature of the outer surface of the inner hull from the confined space under normal operating conditions of the tank. This step enables the absence of any cold spot to be ensured under normal operating conditions of the tank.

The term "normal operating conditions of the tank" is intended to be used to refer to the conditions under which the tank is normally used. The pressure of the primary space may be lower than the secondary space, for example, by a few mbar (millibar), for example, from 2 to 7 mbar, or the pressure of the primary space may be greater than the pressure of the secondary space, for example, from 0 to 4 mbar.

The preliminary step is carried out before the main steps.

According to an embodiment, the intermediate step is carried out before the main steps and after the preliminary step.

According to an embodiment, the method further comprises a subsequent step after the main temperature measurement step involving measuring the temperature of the outer surface of the inner hull from the confined space under normal operating conditions of the tank. This enables it to be determined whether the tank can be used under normal operating conditions following the main steps.

The subsequent step is carried out after the main steps.

According to an embodiment, the temperature measurement of the outer surface of the inner hull from the confined space is carried out by means of a photodetector.

According to an embodiment, the temperature value measured for the outer surface of the inner hull is corrected in order to take into account the emissivity of the outer surface of the inner hull.

According to an embodiment, the duration of each temperature measurement step is at the most 5 hours, preferably a maximum of 3 hours. This duration is conventionally provided to prevent excessively significant cooling of the inner hull below the temperatures tolerated by the material of which the inner hull is composed.

The method according to the invention may further comprise a step of stabilizing the pressures in the primary space and the secondary space, a step of measuring the flow rate of the inert gas injected into the primary space, a step of measuring the flow rate of inert gas leaving the secondary space and a step of comparing the flow rate of inert gas injected into the primary space with the flow rate of inert gas leaving the secondary space in order to identify and quantify the flow rate of inert gas passing through the membrane and thus determining any potential porosity of the secondary membrane.

In a vessel, the tank, for example, on the upper wall thereof, has structures which are referred to as a vapor dome and a liquid dome. They may be in the form of two towers which are intended to allow the passage of cargo handling equipment for handling a liquid phase and a vapor phase of the liquefied gas at low temperature contained in the tank. As a result of this geometry, methods for detecting leakages based on the observation of abnormally hot or abnormally cold zones may fail, in particular as a result of the influence of the external climatic conditions and since the temperature ranges in and close to these towers may be very complex. By monitoring the flow rates of inert gas entering the primary space and leaving the secondary space by adding flow meters in the region of the primary gas inlet and the secondary gas outlet and a comparison of the values of these flow rates, it is thus possible to detect whether there is effectively a leakage in the tank.

According to an embodiment, the preceding steps can be carried out after the main steps. This enables any potential leakage of the gas dome and the liquid dome to be located when no leakage has been detected anywhere else by the temperature measurements.

According to an embodiment, the flow rate measurement steps are carried out at the same time as the main steps. This enables the total duration of the leakage detection method to be shortened and the consumption of inert gas to be reduced for the entire duration of the method.

According to an embodiment, the measurement of the flow rate of inert gas injected into the primary space is carried out at the primary gas inlet by means of a flow meter.

According to an embodiment, the measurement of the flow rate of inert gas leaving the secondary space is carried out at the secondary gas outlet by means of a flow meter.

According to an embodiment, only the primary gas inlet and the secondary gas outlet are open, the other gas inlets and the other gas outlets being closed.

According to an embodiment, the primary gas inlet is located on the liquid dome.

According to an embodiment, the secondary gas outlet is located on the gas dome.

This enables inerting lines which are also present in the domes to be used for these methods for detecting leakages in order to inert the primary and secondary spaces.

According to an embodiment, the inert gas is selected from nitrous oxide, helium, argon and the admixture thereof.

According to an embodiment, the liquefied gas at low temperature is selected from liquefied natural gas, liquefied petroleum gas, liquid ethane, liquid propane, liquid nitrogen, liquid dioxygen, liquid argon, liquid xenon, liquid neon and liquid hydrogen.

Such a method may be used in a floating structure, which is coastal or in deep water, in particular a liquid natural gas tanker, a floating storage and regasification unit (FSRU), a floating production, storage and offloading unit (FPSO) and the like. Such a storage installation may also act as a fuel reservoir in any type of vessel.

According to an embodiment, the invention provides a floating or onshore storage installation for a liquefied gas at low temperature comprising a tank at low temperature comprising a carrier structure which has an inner hull and an outer hull, the space between the inner hull and the outer hull being referred to as the ballast space, a primary sealing membrane which is intended to be in contact with the liquefied gas at low temperature contained in the tank, and a secondary sealing membrane which is arranged between the primary sealing membrane and the inner hull, the space between the primary sealing membrane and the secondary sealing membrane is referred to as the primary space and the space between the secondary sealing membrane and the inner hull is referred to as the secondary space, the primary space comprising a primary gas inlet and a primary gas outlet, the secondary space comprising a secondary gas inlet and a secondary gas outlet. This installation further comprises an inert gas reservoir which is arranged in order to inject the inert gas into the primary space, an injection device which is capable of injecting the inert gas of the inert gas reservoir via the primary gas inlet, and thus placing the primary space under pressure relative to the secondary space, a suction device which is connected to the secondary gas outlet in order to generate a pressure lower than atmospheric pressure in the secondary space, a device for measuring the temperature of the outer surface of the inner hull, and a system for displaying the temperature measurements in order to locate a sealing defect of the secondary sealing membrane in the form of a cold spot on the outer surface of the inner hull.

According to an embodiment, the thickness of the primary sealing membrane is less than or equal to 1.5 mm (millimeter), for example, the thickness is less than or equal to 1.2 mm.

According to an embodiment, the thickness of the secondary sealing membrane is less than or equal to 1.5 mm (millimeter), for example, the thickness is less than or equal to 1.2 mm.

According to an embodiment, the suction device comprises a Venturi effect suction system which comprises a main pipe which has an inlet which is capable of being connected to a pressurized gas source and an outlet toward the outer side of the tank, a suction pipe having an upstream side which is capable of being connected to the outlet port of the secondary space and a downstream side which opens laterally in a convergent/divergent section of the main pipe so that a gas flow in the main pipe produces a reduced pressure in the suction pipe.

According to an embodiment, the suction device comprises a plurality of Venturi effect suction systems, these systems preferably being arranged in series in order to increase the suction capacity.

According to an embodiment, the Venturi effect suction systems are arranged in tiers.

According to an embodiment, the suction pipe is connected to the secondary gas outlet.

According to an embodiment, the pressurized gas source is a compressed air circuit.

According to an embodiment, the injection device is a compressor which is capable of injecting the inert gas at a pressure between 3 and 8 bar.

According to an embodiment, the temperature measurement device is a photodetector.

According to an embodiment, the photodetector is a camera with an infra-red sensor.

According to an embodiment, the infra-red sensor is cooled using cryogeny techniques, for example, the sensor is enclosed in a chamber or enclosed in a Dewar flask, or cooled using a Stirling effect device. This reduction of the temperature of the sensor enables the thermal noise to be reduced.

According to an embodiment, the invention provides a vessel for transporting a liquefied gas at low temperature, comprising an above-mentioned floating storage installation.

According to an embodiment, the invention also provides a method for loading or unloading such a vessel, wherein a liquefied gas at low temperature is conveyed through insulated pipelines from or toward a floating or onshore storage installation toward or from the tank of the vessel.

According to an embodiment, the invention also provides a transfer system for a liquefied gas at low temperature, the system comprising the above-mentioned vessel, insulated pipelines arranged so as to connect the tank installed in the hull of the vessel to a floating or onshore storage installation and a pump for entraining a flow of liquefied gas at low temperature through the insulated pipelines from or toward the offshore or onshore storage installation toward or from the storage installation of the vessel.

BRIEF DESCRIPTION OF THE FIGURES

The invention will be better understood and other objectives, details, features and advantages thereof will be appreciated more clearly from the following description of a number of specific embodiments of the invention, given purely by way of non-limiting example with reference to the appended drawings, in which.

DESCRIPTION OF THE EMBODIMENTS

Figure 1:
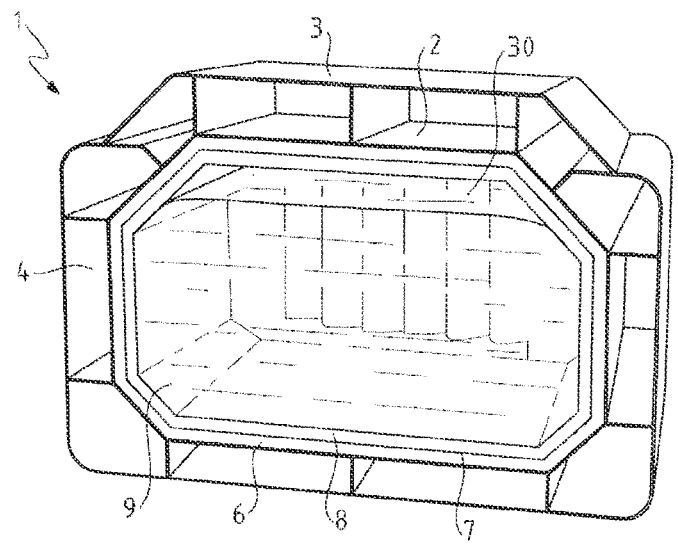
FIG. 1 is a schematic cut-away illustration of a vessel tank.

With reference to FIG. 1, a cross section of a tank 1 of a liquid natural gas tanker produced in accordance with the technology of membrane tanks has been illustrated schematically. A vessel may thus comprise one or more similar tanks. This tank is intended for the transport of liquefied gas at low temperature 30. A liquefied gas at low temperature is in the vapor state under normal pressure and temperature conditions and is placed in the liquid state by lowering the temperature thereof in particular for the transport thereof. This liquefied gas at low temperature could be liquefied natural gas, liquefied petroleum gas, liquid ethane, liquid propane, liquid nitrogen, liquid dioxygen, liquid argon, liquid xenon, liquid neon or liquid hydrogen.

The tank 1 comprises a carrier structure which provides the mechanical rigidity. The carrier structure is a dual wall which comprises an inner hull 2 and an outer hull 3. The inner hull 2 and the outer hull 3 delimit a confined space 4 whose dimensions are sufficient for humans to be able to move therein.

The confined space 4 combines the ballasts, the duct keels, the cofferdams, the passageways and the closure bridge of the tank 1, also referred to as the "trunk deck".

The tank 1 further comprises a primary sealing membrane 9 which is intended to be in contact with the product contained in the tank, and a secondary sealing membrane 7 which is arranged between the primary sealing membrane 9 and the inner hull 2. The secondary sealing membrane 7 is intended to retain the product in the event of a leakage in the primary sealing membrane 9. The space between the primary sealing membrane 9 and the secondary sealing membrane 7 is referred to as the primary space 8 and the space between the secondary sealing membrane 7 and the inner hull 2 is referred to as the secondary space 6.

The primary space 8 and the secondary space 6 comprise insulating materials which are in the form of juxtaposed panels of thermally insulating material. These panels may be of expanded or cellular synthetic resin or another natural or synthetic thermally insulating material. Furthermore, these spaces 6, 8 comprise a filling material such as glass wool or mineral wool. This filling material may be intended to be inserted between the juxtaposed panels.

The primary sealing membrane 9 rests directly on the insulating materials of the primary space 8, and the secondary sealing membrane 7 rests directly on the insulating materials of the secondary space 6.

Figure 2:
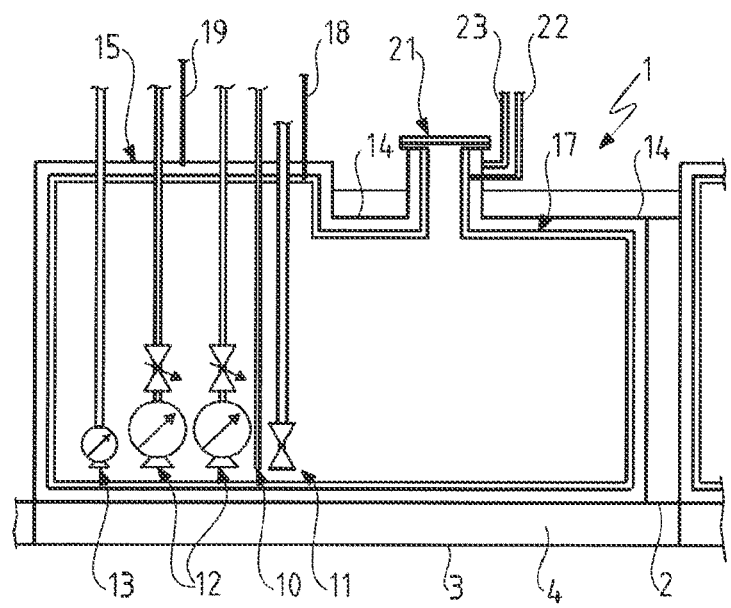
FIG. 2 is a functional diagram of a vessel tank viewed in section along a longitudinal axis of the vessel.

With reference to FIG. 2, the tank comprises an upper wall 14 which is interrupted at two locations by two protruding structures in the form of a tower or chimney. They are intended to allow the passage of cargo handling equipment for handling a liquid phase and a vapor phase of the liquefied gas at low temperature with a view to its storage in the tank. The first tower is a liquid dome 15 which acts as an introduction location for various items of handling equipment, that is to say, in the example illustrated a filling line 10, an emergency pumping line 11, unloading lines which are connected to unloading pumps 12, a spraying line (not illustrated) and a supply line which is connected to a spraying pump 13. The second tower is a vapor dome 21 which acts as an introduction location for a vapor collection pipe. The operation of this equipment is further known.

The primary space 8 comprises a primary gas inlet 18 and a primary gas outlet 26. It may further comprise a second primary gas inlet 22. The secondary space 6 comprises a secondary gas inlet 25 and a secondary gas outlet 19. The secondary space 6 may further comprise a second secondary gas outlet 20 and a third secondary gas outlet 23.

The tank may further comprise a safety valve 24 in the event of excess pressure in the primary space 8 and secondary space 6.

The secondary sealing membrane 7 is invisible and inaccessible after the tank has been produced. The method for checking the sealing of a tank according to the invention enables defects of the secondary sealing membrane 7 to be detected and located and is suitable for the majority of tank technologies.

Figure 3:
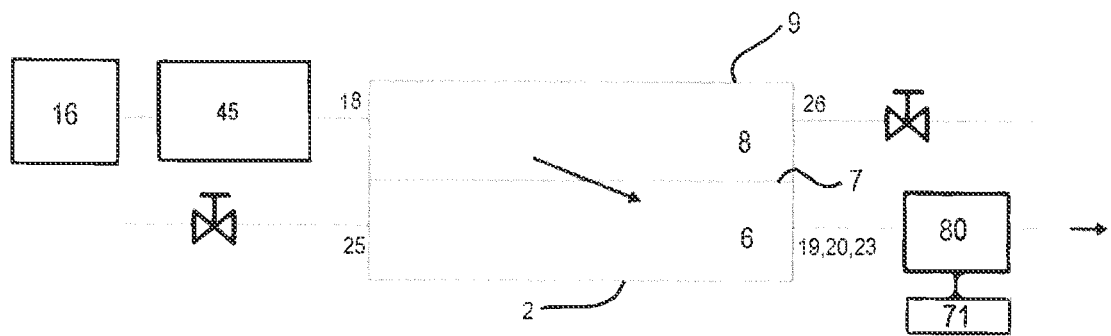
FIG. 3 is a schematic diagram of the method of the invention.

With reference to FIG. 3, the method is based on the use of a thermal gradient which is generated between the primary space 8 and secondary space 6 of a tank 1 loaded with liquefied gas at low temperature 30 in order to detect by means of thermal imaging or thermography the impact on the inner hull 2 of an inert gas passing through the secondary sealing membrane 7. The tank is loaded at least to 20% of the total capacity thereof with liquefied gas at low temperature or is cooled by spraying a cryogenic liquid.

Figure 4:
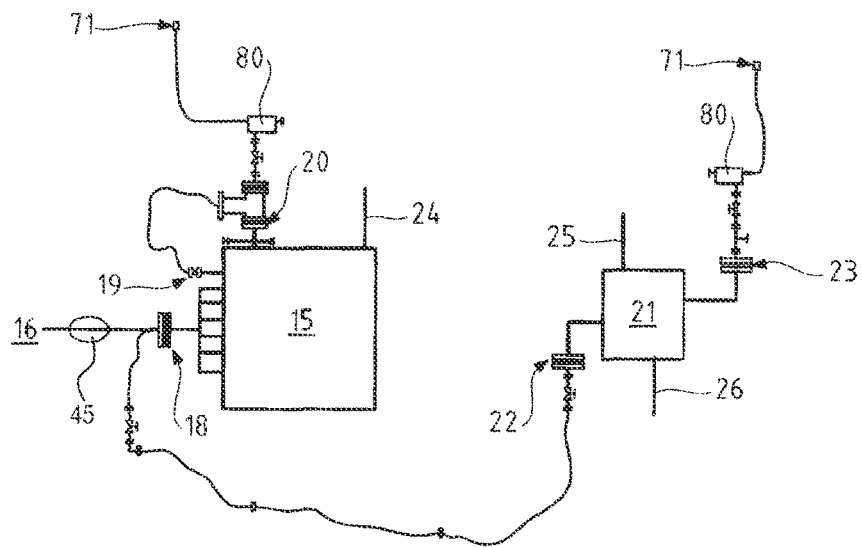
FIG. 4 is a schematic illustration of the nitrous oxide flow circuit in a storage installation.

Also with reference to FIG. 4, in order to implement the main steps of the method, an injection device 45 is installed at the primary gas inlet 18 and attached to the inert gas reservoir 16. The inert gas is, for example, nitrous oxide. This injection device 45 will enable inert gas to be injected into the primary space 8. A suction device 80 is also installed in the region of the secondary gas outlet 19. This will enable the generation of a pressure difference between the primary space 8 and the secondary space 6 to be made easier, even if the porosity of the secondary sealing membrane 7 is very significant.

Figure 6:
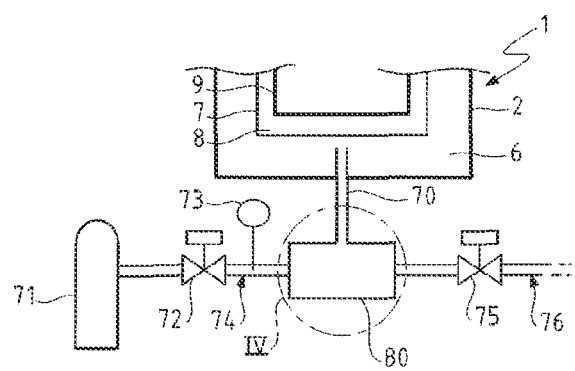
FIG. 6 is a schematic illustration of the arrangement of the Venturi effect suction system relative to the secondary space.
Figure 7:
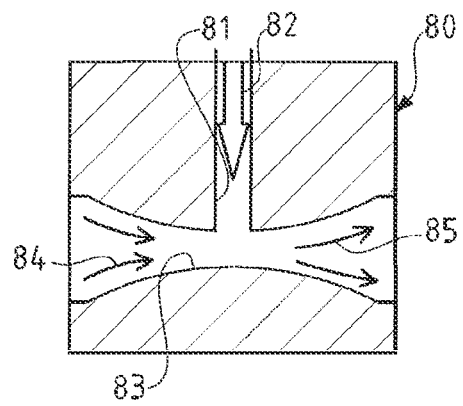
FIG. 7 is an enlarged sectional illustration of the zone IV of FIG. 6.

The suction device may, for example, be a system of the Venturi type. It will thus be connected to the compressed air system 71 of the boat. With reference to FIGS. 6 and 7, the operation of the Venturi system will be described. When the valves 72 and 75 are open, a flow of compressed air is introduced into the inlet side of the convergent/divergent section, as indicated by the arrows 84, and brings about as a result of the Venturi effect a reduced pressure in the lateral pipeline 81 of the Venturi effect suction system 80 which is connected to the sampling pipeline 70 which is connected to the secondary gas outlet 19 of the secondary space 6. A quantity of inert gas contained in the secondary space 6 is subsequently drawn in, as indicated by the arrow 82. The flow of inert gas drawn in and the flow of compressed air mix in the outlet side of the convergent/divergent section, as indicated by the arrows 85, and flow into the pipeline 76 which opens at the outer side of the tank.

Preferably, a valve which is not illustrated is also provided in the sampling pipeline 70 which is opened only after a stable flow of compressed air has been established at an appropriate speed in the main pipe 83. This enables a reflux of air in the direction of the secondary space 6 to be prevented during the starting phase of the flow of compressed air. It is possible in the same manner to completely or partially close this valve before interrupting the flow of compressed air or to control the flow rate/suction flow.

Before carrying out the main steps, it is possible to reduce the heating of the confined space 4 at least 3 hours before the detection by means of thermography. This is because heating could conceal a potential cold spot 43 on the inner hull 2.

Then, it is ensured that the gas pressure in the tank 1, if it is filled with a liquefied gas at low temperature, is greater than 50 mbarg. Then, the value of the pressure in the secondary space 6 is reduced in order to reach a value between 1 mbarg and 5 mbarg using the suction device and leaving in an open position only the secondary gas outlet 19, all the other gas inlets and gas outlets of the secondary space 6 being closed. The secondary gas outlet 19 is preferably located on the liquid dome 15. However, it is possible to accelerate the process by connecting the suction device 80 to a second secondary gas outlet 20 of the secondary space which is placed in an open position. The second secondary gas outlet 20 is preferably located on the liquid dome 15. Should this not be sufficient, the suction device 80 could be connected to a third secondary gas outlet 23 of the secondary space which is then also placed in an open position. The third secondary gas outlet 23 is preferably located on the liquid dome 15. Where applicable, it is possible to use a suction device 80 for each gas outlet of the secondary space.

Afterwards, the injection device 45 is activated in order to inject nitrous oxide from the gas source 71 into the primary space 8 via the primary gas inlet 18 so that the value of the pressure in the primary space 8 reaches a value between 21 and 29 mbar above the pressure of the secondary space 6.

Only the primary gas inlet 18 is left in the open position, all the other gas inlets and outlets of the primary space 8 being closed. If this is not sufficient, the injection device 45 may also be connected to a second primary gas inlet 22 of the primary space 8. This second primary gas inlet 22 may be located in the region of the gas dome. Where applicable, stabilization of the pressure is then awaited. This may take between 30 and 60 minutes.

The pressures of the primary and secondary spaces are controlled within acceptable pressure ranges by safety valves (not illustrated) of the primary and secondary spaces.

It is then possible to carry out the measurement of the temperatures on the outer surface of the inner hull 2 by means of thermography from the confined space 4.

After the measurement has been carried out, the pressures of the spaces are returned to their values for normal operating conditions and the heating of the confined space 4.

Figure 5:
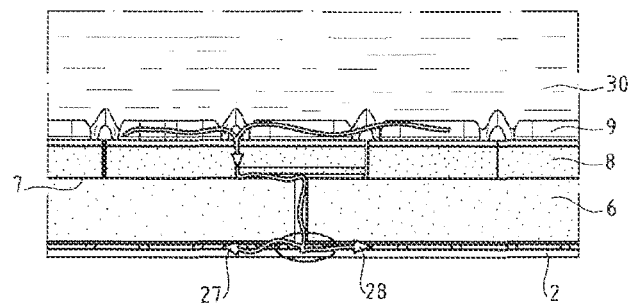
FIG. 5 is a schematic illustration of the nitrous oxide flow from the primary space to the secondary space resulting from an abnormal porosity of the sealing membrane.

With reference to FIG. 5, using this method, the inert gas is cooled by passing into the primary space 6. Then, the cooled inert gas passes through the secondary sealing membrane 7 if it has normal porosities as indicated by the arrows 27, 28 in FIG. 7. The cooled inert gas will then generate a cold spot 43 on the inner hull 2. A thermal camera is then used to detect the potential cold spot 43 on the outer surface of the inner hull 2.

In order to measure the temperature of the outer surface of the inner hull 2 from the confined space 4, a photodetector can be used such as a thermographic camera with an infrared sensor as a result of the extent for which it is necessary to measure the temperature. It records different infrared radiations which are transmitted by the surface observed and which vary as a function of their temperature. For example, a thermographic camera with a cooled infrared sensor can be used. This type of camera uses a container which is cooled by cryogenic techniques, the sensor being able to be enclosed in a vacuum chamber. This reduction or this control of the temperature of the sensor may be found to be advantageous for reducing the thermal noise to a level less than that of the signal of the scene filmed.

Typically, it is possible to use a thermographic camera with an infrared sensor which is capable of detecting wavelengths between 7.5 and 13 µm, with a sensitivity of less than 0.05 K on a black body at 303K±10K and a precision of less than 2K on a black body in the range from 253K to 353K.

Figure 8:
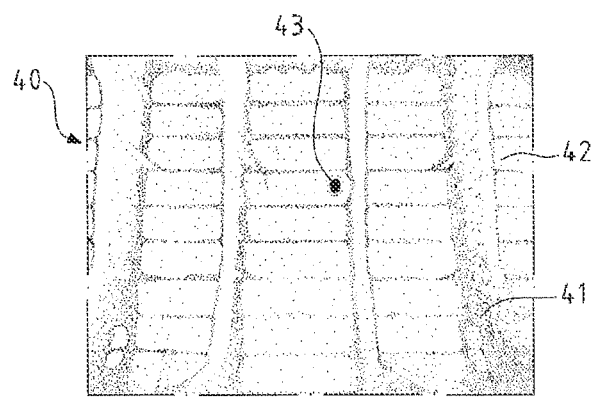
FIG. 8 is an illustration of a thermogram obtained according to the method of the invention.

In FIG. 8, a thermogram 40 of a portion of an outer surface of the inner hull 2 obtained using a thermographic camera with an infrared sensor is illustrated. This thermogram 40 is an image in which at each point of the image there is allocated a temperature value observed by the thermographic camera with an infrared sensor. In order to facilitate the visual detection of the temperatures and therefore to facilitate the location of a cold spot on the inner hull 2, a color representing a temperature may be associated with the points of the thermogram. In this manner, it is possible to see in FIG. 8 several colors, a first color 41 represents a temperature $T_1$, a second color 42 represents a temperature $T_2$ and a third color 43 represents a temperature $T_3$. The temperature $T_1$ is greater than the temperature $T_2$, the temperature $T_2$ is greater than the temperature $T_1$. Given the color observed 43, in this instance black, blue in a color image, the temperature $T_3$ is considered to be a cold spot.

However, it is possible to obtain cold spots which are not caused by a sealing defect. They may be the result of other phenomena which take place in the secondary space, such as conduction, natural convection, forced convection or radiation. In order to eliminate them and to refine the detection of leakages in the secondary sealing membrane 7, the data obtained using the thermographic camera may be post-processed. In this manner, the temperature gradient illustrated by the cold spot must comply with the following two conditions:

$$|\Delta T_{ultérieur}| < |\Delta T_{intermédiaire}| < |\Delta T_{principal}| \text{ and}$$
$$|\Delta T_{principal}| - |\Delta T_{ultérieur}| \geq 1 \text{ K}$$

where $\Delta T_{ultérieur}$ indicates the temperature difference between the temperature of a point of the image measured in the subsequent step and the mean temperature of a reference zone of the outer side of the inner hull measured in the subsequent step, where $\Delta T_{intermédiaire}$ indicates the temperature difference between the temperature of the preceding point of the image measured in the intermediate step and the mean temperature of a reference zone of the outer side of the inner hull measured in the intermediate step, where $\Delta T_{principal}$ indicates the temperature difference between the temperature of the preceding point of the image measured in the main temperature measurement step and the mean temperature of a reference zone of the outer side of the inner hull measured in the main step, the preliminary, subsequent and intermediate steps being explained below.

The method for checking the sealing of a tank may comprise a preliminary step whose objective is to ensure that there is no cold spot on the inner hull under normal operating conditions of the tank. It may also enable the emissivity of the painting of the inner hull to be verified locally in order to determine the performance levels of the temperature measurement.

First of all, the heating of the confined space is reduced or stopped at least 3 hours before the inspection. The pressures of the primary space 8 and secondary space 6 are maintained in accordance with the normal operating conditions of the tank, for example, the pressure of the secondary space 6 is greater than the pressure of the primary space 8. Then, the inner hull 2 is completed inspected using a thermal camera. This enables a thermal image of the inner hull 2 to be obtained under normal operating conditions of the tank. At the end of the inspection, the system of the confined space 4 is returned to normal operating conditions.

In order to ensure that the tank has not been damaged or the state thereof worsened by the main steps, a subsequent step for measuring the temperature of the outer surface of the inner hull 2 is carried out. This subsequent step is identical in all regards to the preliminary step with respect to the conditions of implementation. If the preliminary step has been carried out, it will then be possible to compare the thermograms obtained in order to draw a conclusion regarding the state of the tank under normal operating conditions. If the preliminary step has not been carried out, it will then be possible to ensure that there is no cold spot on the thermogram.

Finally, the method may also include an intermediate step in order to determine whether the tank is capable of withstanding the main steps. In this manner, the intermediate step can be carried out before the main steps and after the preliminary step. This step involves measuring the temperature of the outer surface of the inner hull (2) from the confined space 4 when the pressure difference between the primary space 8 and the secondary space 6 is between 800 Pa and 1200 Pa, the primary space 8 being under excess pressure by the pressure difference compared with the secondary space 6.

Before carrying out this intermediate step, it is possible to reduce the heating of the confined space 4 at least 3 hours before the detection by means of thermography. This is because, in this instance also the heating could mask any potential cold spot 43 on the inner hull 2. Then, it is ensured that the gas pressure in the tank 1, if it is filled with a liquefied gas at low temperature, is greater than 50 mbarg. Then, the value of the pressure in the secondary space 6 is reduced in order to achieve a value between 1 mbarg and 5 mbarg using the suction device and leaving only the secondary gas outlet 19 in an open position. Afterwards, the injection device 45 is activated in order to inject nitrous oxide from the gas source 71 into the primary space 8 through the primary gas inlet 18 so that the pressure value in the primary space 18 reaches a value between 8 and 12 mbar above the pressure of the secondary space 6. Only the primary gas inlet 18 is left in the open position, all the other gas inlets and gas outlets of the primary space 8 being closed. Where applicable, the stabilization of the pressure is then awaited. This can take between 30 and 60 minutes. The pressures of the primary and secondary spaces are controlled in the pressure ranges acceptable by the safety valves (not illustrated) of the primary and secondary spaces. It is then possible to carry out the measurement of the temperatures on the outer surface of the inner hull 2 by means of thermography from the confined space 4. After the measurement has been carried out, the pressures of the spaces are returned to their values for normal operating conditions and the heating of the confined space 4.

In this manner, if the thermogram obtained following this intermediate step does not have significant cold spots, the tank will be able to withstand the main steps of the method.

As a result of the geometry of the liquid dome 15 and the gas dome 21, the method described above may fail. This is because the external climatic conditions and the temperature ranges in and in the vicinity of these towers may distort the temperature measurements with the thermographic camera and/or be very complex to take into account in the post-processing of the temperature measurements. The method may thus be supplemented with a measurement of the flow of nitrogen passing through the potential leakages of the secondary sealing membrane 7. Preferably, the flow will be orientated from the primary space to the secondary space.

As this measurement consumes nitrogen, it can be carried out in parallel with the preceding steps, in particular the main steps. However, it may be carried out after the main steps or the subsequent step.

Figure 9:
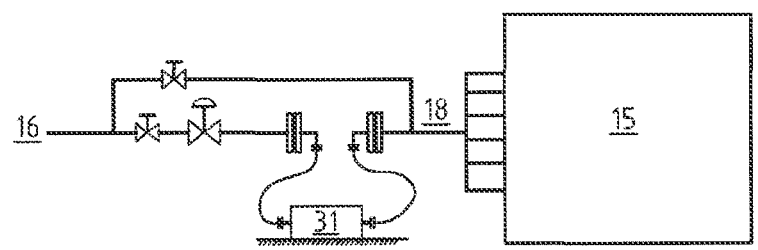
FIG. 9 is an illustration of the arrangement of a flow meter at a primary gas inlet of the primary space.

In order to measure the consumption of nitrogen, flow meters are installed. With reference to FIG. 9, a first flow meter 31 is installed in the liquid dome 15. The flow meter 31 is installed on the pipeline which connects the nitrogen source 16 and the primary gas inlet 18. The other primary inlets are placed in a closed position. The primary outlets are themselves also in a closed position. In this manner, the only possible path of the nitrogen flow is to pass toward the secondary space if the secondary sealing membrane 7 has an abnormal porosity. This flow meter will therefore enable the flow of nitrogen entering the primary space to be measured.

In order to facilitate the assembly and disassembly of the flow meter 31, it is possible to provide a circuit of pipes which are mounted in series with valves, as illustrated in FIG. 9, with a valve on a first branch, this valve being closed in order to obtain a correct flow rate measurement, and a valve and the flow meter 31 on a second branch.

Figure 10:
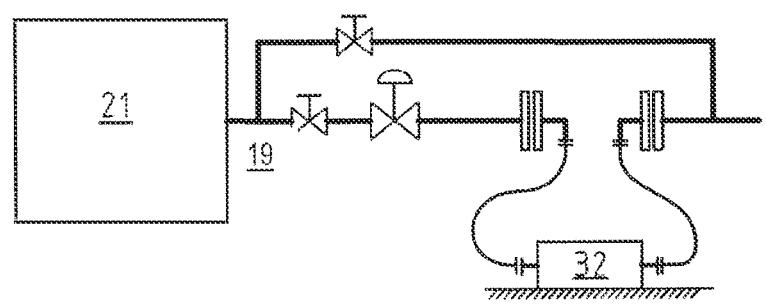
FIG. 10 is an illustration of the arrangement of a flow meter at a secondary gas outlet of the secondary space.

With reference to FIG. 10, a second flow meter 32 is installed, it is placed at the level of the secondary gas outlet 19 of the secondary space 6 located on the gas dome 21. The secondary inlets and the other secondary outlets are in a closed position. In this manner, the flow meter correctly measures the flow of nitrogen passing from the primary space 8 to the secondary space 6 via an abnormal porosity of the secondary sealing membrane 7.

With this arrangement, it is ensured that the flow of nitrogen passes via the flow meters and losses of information are prevented. It should be noted that the location of the flow meters may be different on each vessel.

In order to facilitate the assembly and the disassembly of the flow meter 32, it is possible to provide a circuit of pipes which are mounted in parallel with valves, as illustrated in FIG. 10, with a valve on a first branch, and a valve and the flow meter 32 on a second branch, this valve being closed in order to obtain a correct flow rate measurement.

Before the installation of the flow meters, it is ensured that the pressures in the primary and secondary spaces are normal, that is to say, the pressures observed under normal operating conditions. The vapor pressure in the tank, if it is filled with liquefied gas at low temperature, has to be maintained above 50 mbarg, preferably above 100 mbarg. The primary and secondary inlets and the primary and secondary outlets which can influence the measurement of the flow of nitrogen are then placed in a closed position. Then, the flow meters are installed, the first 31 is placed at the primary gas inlet 18 and the second 32 is placed at the secondary gas outlet 19 or at the second secondary gas outlet 20. After the flow meters 31, 32 have been assembled, the primary space 8 is supplied with nitrogen whilst controlling this supply using a valve, for example, up to 12 $m^3/h$ (cubic meters per hour). The measurement of the flow rates entering the primary space and leaving the secondary space using the flow meters is then begun. The control and the measurement of the flow rates at the primary gas inlet 18 and the secondary gas outlet 19 lasts a maximum of 5 hours, preferably 3 hours.

At the end of the measurements, the flow rates at the primary gas inlet 18 and the secondary gas outlet 19 are compared. If the measurements are similar, the secondary sealing membrane 7 has an abnormal porosity, in particular in the region of the liquid dome and/or gas dome. If the flow rates are significantly different or the flow rate at the secondary gas outlet is zero, however, the secondary sealing membrane 7 does not have abnormal porosity anywhere.

The installation which is described above and uses the method described above may be used, for example, in an onshore installation or in a floating structure such as a liquid natural gas tanker or the like.

Figure 11:
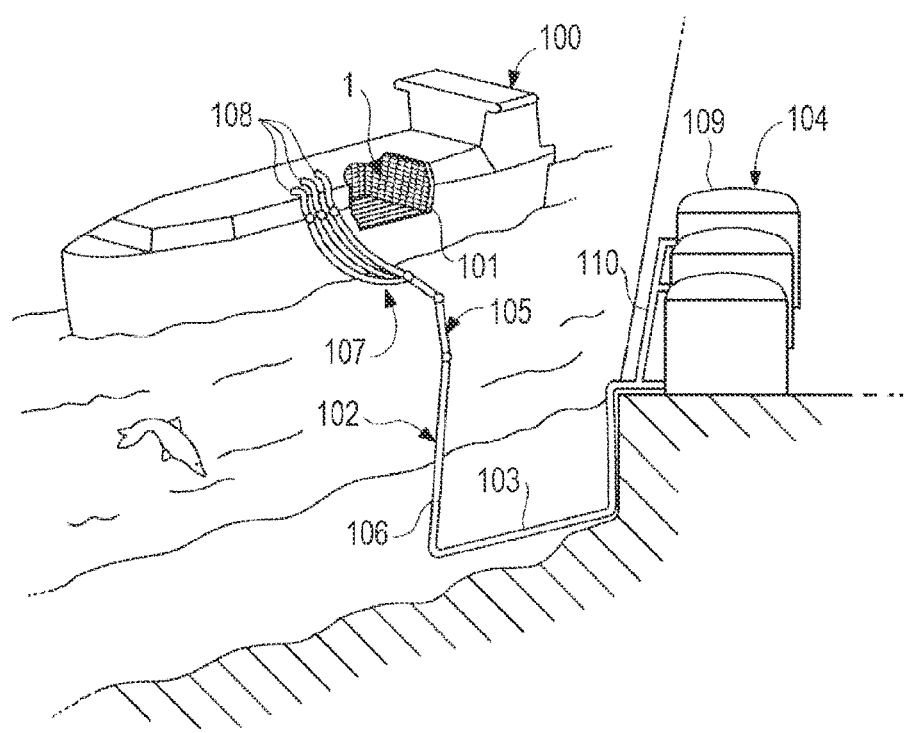
FIG. 11 is a schematic cut-away illustration of a storage installation for a liquefied gas at low temperature for a liquid natural gas tanker and a terminal for loading/unloading a tank of the storage installation for a liquefied gas at low temperature.

With reference to FIG. 11, a cut-away view of a liquid natural gas tanker 100 shows an installation for storing a liquefied gas at low temperature comprising a sealed and insulated tank 1 of generally prismatic shape mounted in the dual hull 101 of the vessel. The tank 1 comprises a primary sealing membrane which is intended to be in contact with the liquefied gas at low temperature LNG contained in the tank such as LNG, a secondary sealing membrane which is arranged between the primary sealing membrane and the dual hull 101 of the vessel, and two insulating barriers which are arranged between the primary sealing membrane and the secondary sealing membrane and between the secondary sealing membrane and the dual hull 101, respectively.

With reference to FIG. 11, a cut-away view of a liquid natural gas tanker 100 shows an installation for storing a liquefied gas at low temperature comprising a sealed and insulated tank 1 of generally prismatic shape mounted in the dual hull 101 of the vessel. The tank 1 comprises a primary sealing membrane which is intended to be in contact with the liquefied gas at low temperature LNG contained in the tank, such as LNG, a secondary sealing membrane which is arranged between the primary sealing membrane and the dual hull 101 of the vessel, and two insulating barriers which are arranged between the primary sealing membrane and the secondary sealing membrane and between the secondary sealing membrane and the dual hull 101, respectively.

FIG. 11 shows an example of a sea terminal comprising a loading and unloading station 103, an underwater pipe 104 and an onshore installation 105. The loading and unloading station 103 is a fixed offshore installation which comprises a movable arm 106 and a tower 107 which supports the movable arm 106. The movable arm 106 carries a bundle of insulated flexible pipes 108 which can be connected to the loading/unloading channels 109. The movable arm 106 which can be orientated adapts to all gauges of liquid natural gas tankers. A connection pipe which is not illustrated extends inside the tower 107. The loading and unloading station 103 enables the vessel 100 to be loaded and unloaded to or from the ground-based installation 105. This comprises storage tanks for liquefied gas at low temperature 110 and connection pipes 111 which are connected via the underwater pipe 104 to the loading and unloading station 103. The underwater pipe 104 enables the liquefied gas at low temperature to be transferred between the loading and unloading station 103 and the ground-based installation 105 over a great distance, for example, 5 km, which enables the vessel 100 to be kept at a great distance from the coast during the loading and unloading operations.

In order to bring about the pressure required for the transfer of the liquefied gas at low temperature, pumps on board the vessel 100 and/or pumps with which the ground-based installation 105 is provided and/or pumps with which the loading and unloading station 103 is provided are used.

Although the invention has been described in connection with several specific embodiments, it is self-evident that it is by no means limited thereto and that it comprises all the technical equivalents of the means described and the combinations thereof if they are included within the scope of the invention.

The use of the verb "have", "comprise" or "include" and the conjugated forms thereof does not exclude the presence of elements or steps other than those set out in a claim.

In the claims, any reference numeral in brackets should not be interpreted to be a limitation of the claim.

The invention claimed is:

1. A method for checking the sealing of a sealed and thermally insulating tank for storing a liquefied gas at a temperature at which the gas is liquified, the tank being at the temperature at which the gas is liquified, the tank comprising a carrier structure which has an inner hull and an outer hull, a confined space between the inner hull and the outer hull, a primary sealing membrane which is intended to be in contact with the liquefied gas at the temperature at which the gas is liquified contained in the tank, and a secondary sealing membrane which is arranged between the primary sealing membrane and the inner hull, a primary space between the primary sealing membrane and the secondary sealing membrane and a secondary space between the secondary sealing membrane and the inner hull, the primary space and the secondary space comprising insulating materials, the primary space comprising a primary gas inlet and a primary gas outlet, the secondary space comprising a secondary gas inlet and a secondary gas outlet, the primary sealing membrane resting directly on the insulating materials contained in the primary space and the secondary sealing membrane resting directly on the insulating materials contained in the secondary space, the method comprising the following main steps:

generating a pressure lower than the pressure of the primary space in the secondary space using a suction device which is connected to the secondary gas outlet, measuring the temperature of an outer surface of the inner hull from the confined space located around the inner hull, detecting the location of a sealing defect of the secondary sealing membrane in the form of a cold spot on the outer surface of the inner hull.

2. The method as claimed in claim 1, further comprising:
injecting an inert gas into the primary space from the primary gas inlet.

3. The method as claimed in claim 2, wherein the injection of inert gas is carried out by a compressor.

4. The method as claimed in claim 2, wherein the injection of inert gas is carried out at a pressure between 3 and 8 bar.

5. The method as claimed in claim 1, wherein the pressure difference between the primary space and the secondary space is between 2100 Pa and 2900 Pa, the primary space being under excess pressure by the pressure difference compared with the secondary space.

6. The method as claimed in claim 1, further comprising a preliminary step which involves:

measuring the temperature of the outer surface of the inner hull from the confined space under normal operating conditions of the tank.

7. The method as claimed in claim 1, further comprising an intermediate step which involves:

measuring the temperature of the outer surface of the inner hull from the confined space when the pressure difference between the primary space and the secondary space is between 800 Pa and 1200 Pa, the primary space being under excess pressure by the pressure difference compared with the secondary space.

8. The method as claimed in claim 7, wherein the pressures of the primary space and the secondary space are kept stable during the step of measuring the temperature of the outer surface of the inner hull during the main temperature measurement step and the intermediate temperature measurement step.

9. The method as claimed in claim 1, further comprising a subsequent step after the main temperature measurement step which involves:

measuring the temperature of the outer surface of the inner hull from the confined space under normal operating conditions of the tank.

10. A floating or onshore storage installation for a liquefied gas at a temperature at which the gas is liquified comprising:

a tank at the temperature at which the gas is liquified comprising a carrier structure which has an inner hull and an outer hull, the space between the inner hull and the outer hull being referred to as the confined space, a primary sealing membrane which is intended to be in contact with the liquefied gas at the temperature at which the gas is liquified contained in the tank, and a secondary sealing membrane which is arranged between the primary sealing membrane and the inner hull, the space between the primary sealing membrane and the secondary sealing membrane is referred to as the primary space and the space between the secondary sealing membrane and the inner hull is referred to as the secondary space, the primary space and the secondary space comprising insulating materials, the primary space comprising a primary gas inlet and a primary gas outlet, the secondary space comprising a secondary gas inlet and a secondary gas outlet, the primary sealing membrane resting directly on the insulating materials contained in the primary space and the secondary sealing membrane resting directly on the insulating materials contained in the secondary space, an inert gas reservoir which is arranged in order to inject the inert gas into the primary space, an injection device for injecting the inert gas of the inert gas reservoir via the primary gas inlet, and thus placing the primary space under pressure relative to the secondary space, a suction device which is connected to the secondary gas outlet in order to generate a pressure lower than atmospheric pressure in the secondary space, a device for measuring the temperature of the outer surface of the inner hull, a system for displaying the temperature measurements in order to locate a sealing defect of the secondary sealing membrane in the form of a cold spot on the outer surface of the inner hull.

11. The installation as claimed in claim 10, wherein the suction device is a Venturi effect suction system which comprises a main pipe which has an inlet which is capable of being connected to a pressurized gas source, and an outlet toward the outer side of the tank, a suction pipe having an upstream side which is capable of being connected to the outlet port of the secondary space and a downstream side which opens laterally in a convergent/divergent section of the main pipe produces a reduced pressure in the suction pipe.

12. The installation as claimed in claim 11, wherein the suction pipe is connected to the secondary gas outlet.

13. The installation as claimed in claim 11, wherein the pressurized gas source is a compressed air circuit.

14. The installation as claimed in claim 10, wherein the injection device is a compressor which is capable of injecting the inert gas at a pressure between 3 and 8 bar.

15. A vessel for transporting a liquefied gas at a temperature at which the gas is liquified, the vessel comprising an installation for storing a liquefied gas at low temperature as claimed in claim 10.

* * * * *